United States Patent
Bruno et al.

(10) Patent No.: US 10,814,988 B2
(45) Date of Patent: Oct. 27, 2020

(54) UNEQUAL BLEED FLOW

(71) Applicant: Hamilton Sundstrand Corporation, Windsor Locks, CT (US)

(72) Inventors: Louis J. Bruno, Ellington, CT (US); Thomas M. Zywiak, Southwick, MA (US); Erin G. Kline, Vernon, CT (US); Christina W. Millot, Wilbraham, MA (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 163 days.

(21) Appl. No.: 15/175,512

(22) Filed: Jun. 7, 2016

(65) Prior Publication Data
US 2016/0355269 A1 Dec. 8, 2016

Related U.S. Application Data

(60) Provisional application No. 62/172,443, filed on Jun. 8, 2015.

(51) Int. Cl.
*B64D 13/06* (2006.01)
(52) U.S. Cl.
CPC ........ *B64D 13/06* (2013.01); *B64D 2013/064* (2013.01); *B64D 2013/0618* (2013.01); *Y02T 50/56* (2013.01)
(58) Field of Classification Search
CPC .. B64D 13/06; B64D 13/04; B64D 2013/064; B64D 2013/0618
USPC .......................................................... 165/41
See application file for complete search history.

(56) References Cited

U.S. PATENT DOCUMENTS

| 4,779,644 A | | 10/1988 | Benson | |
|---|---|---|---|---|
| 5,414,992 A | * | 5/1995 | Glickstein | B64D 13/006 60/39.83 |
| 5,461,882 A | | 10/1995 | Zywiak et al. | |
| 5,511,385 A | | 4/1996 | Drew et al. | |
| 5,704,218 A | * | 1/1998 | Christians | B64D 13/06 62/172 |
| 5,967,461 A | * | 10/1999 | Farrington | B64D 13/06 244/118.5 |
| 6,189,324 B1 | * | 2/2001 | Williams | B64D 13/06 62/172 |
| 6,305,156 B1 | * | 10/2001 | Lui | B64D 13/06 454/76 |

(Continued)

FOREIGN PATENT DOCUMENTS

JP 2013252851 A 12/2013

OTHER PUBLICATIONS

European Search Report Issued in European Application No. 16808171.9 dated Dec. 11, 2018; 9 Pages.

(Continued)

*Primary Examiner* — Devon Russell
(74) *Attorney, Agent, or Firm* — Cantor Colburn LLP

(57) ABSTRACT

A system is provided. The system includes a first environmental control sub-system, operating in a first mode, that receives a first medium at a first flow amount and a first pressure. The system also includes a second environmental control sub-system, operating in a second mode, that receives a second medium at a second flow amount and a second pressure. The first flow amount is greater than the second flow amount, and the second pressure is greater than the first pressure.

3 Claims, 3 Drawing Sheets

(56) References Cited

U.S. PATENT DOCUMENTS

| | | | |
|---|---|---|---|
| 7,036,319 B2 | 5/2006 | Saunders et al. | |
| 7,536,865 B2 | 5/2009 | Mikhail | |
| 8,033,118 B2 | 10/2011 | Monteiro et al. | |
| 8,529,189 B2 * | 9/2013 | Brown | F02C 6/08 |
| | | | 415/1 |
| 9,650,967 B2 * | 5/2017 | DeFrancesco | F02C 9/18 |
| 9,669,936 B1 | 6/2017 | Fiterman et al. | |
| 9,765,700 B2 * | 9/2017 | Mackin | F02C 6/04 |
| 9,878,794 B2 * | 1/2018 | Bruno | B64D 13/06 |
| 2010/0107594 A1 * | 5/2010 | Coffinberry | F02C 6/08 |
| | | | 60/39.093 |
| 2013/0164115 A1 | 6/2013 | Sennoun | |
| 2014/0083647 A1 | 3/2014 | Army, Jr. et al. | |
| 2014/0109978 A1 | 4/2014 | Simpson et al. | |
| 2014/0352324 A1 * | 12/2014 | Ernst | F02C 7/18 |
| | | | 60/806 |
| 2015/0107261 A1 | 4/2015 | Moes et al. | |
| 2015/0121842 A1 * | 5/2015 | Moes | B64D 13/06 |
| | | | 60/204 |
| 2015/0247463 A1 * | 9/2015 | DeFrancesco | B64D 13/08 |
| | | | 60/782 |
| 2015/0307196 A1 * | 10/2015 | Bruno | F02C 6/08 |
| | | | 62/61 |

OTHER PUBLICATIONS

International Search Report Issued in International Patent Application No. PCT/US2016/036416 dated Sep. 13, 2016; 5 Pages.

Written Opinion Issued in International Application No. PCT/US2016/036416 dated Sep. 13, 2016; 6 Pages.

* cited by examiner

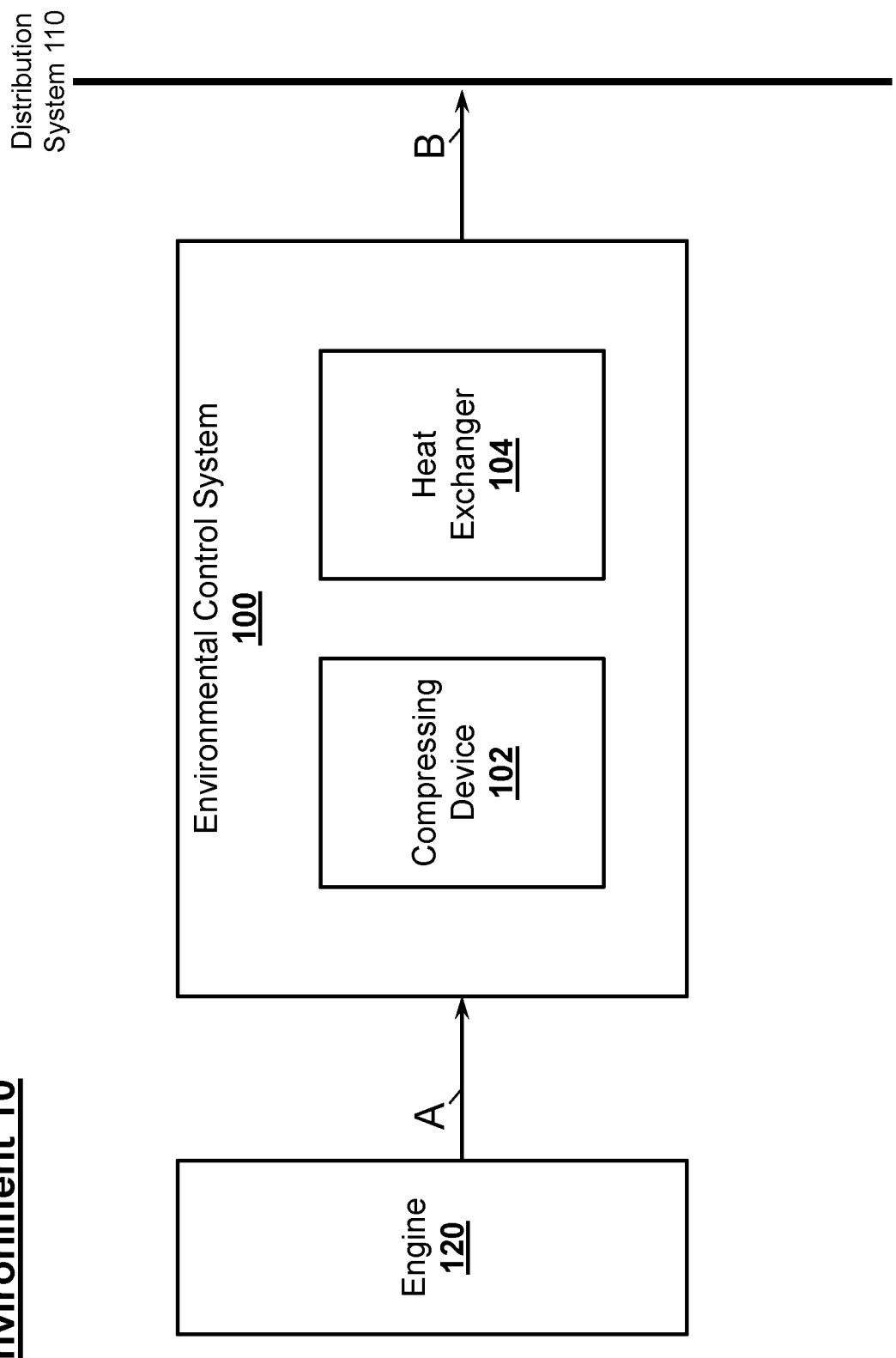

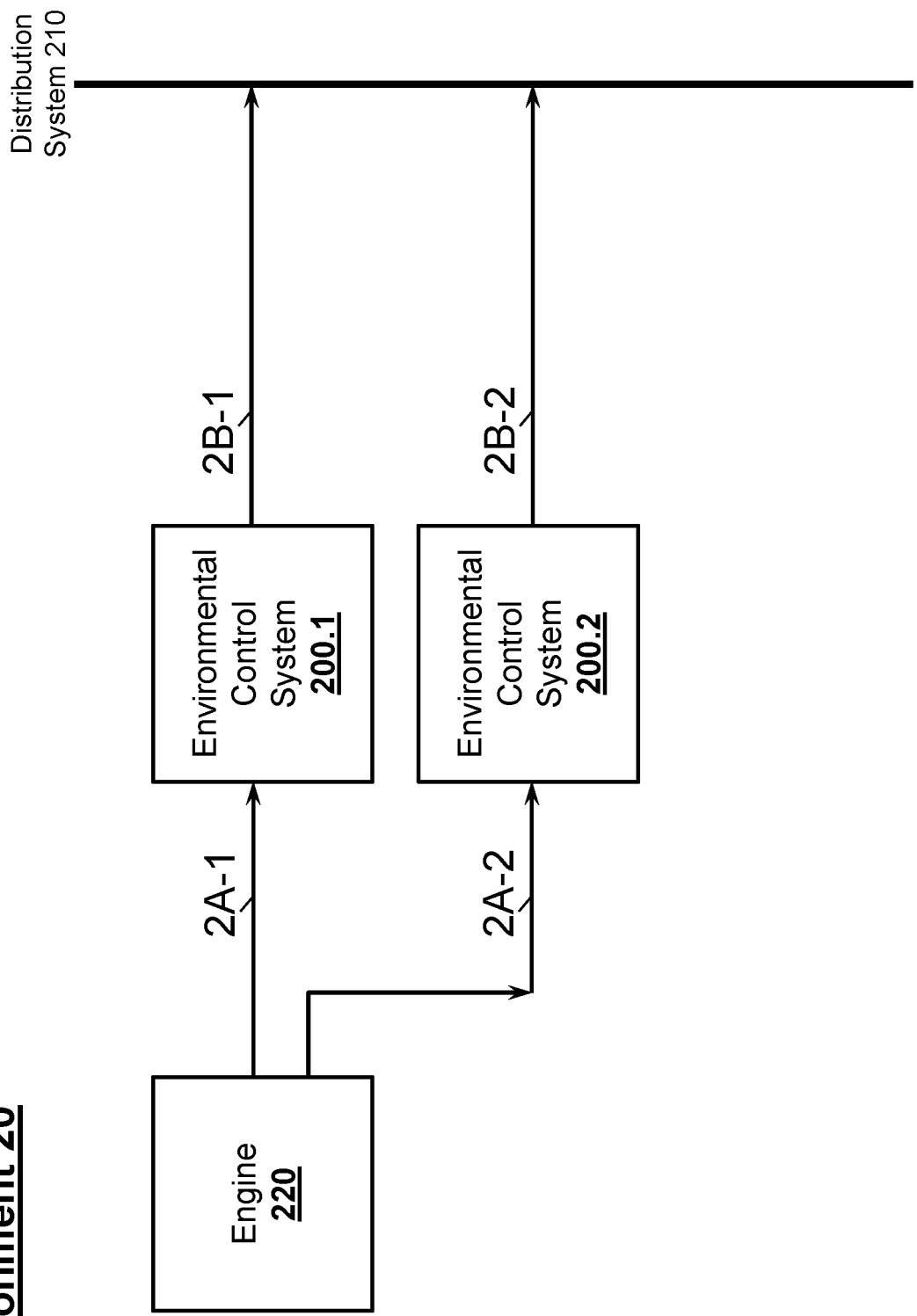

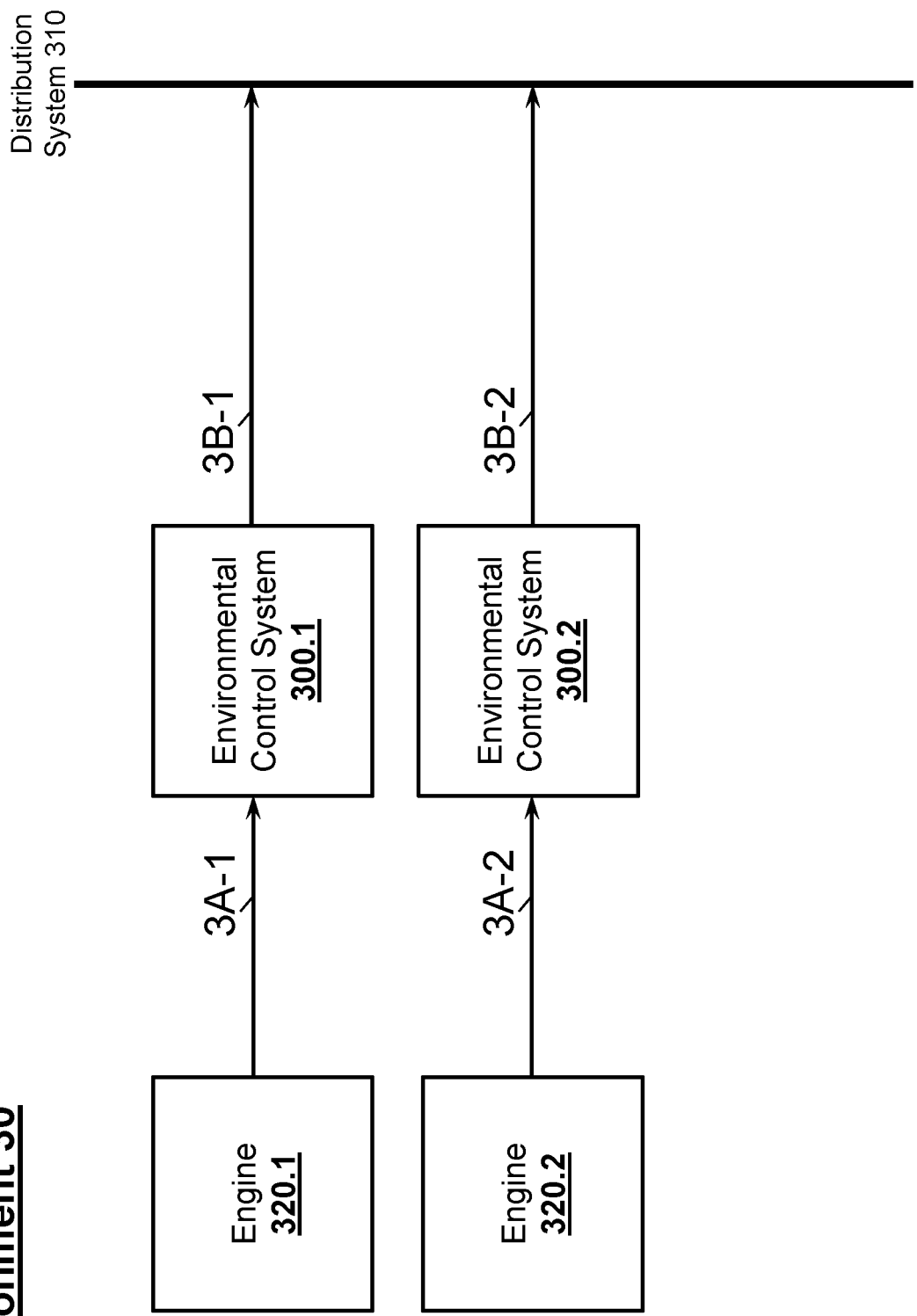

UNEQUAL BLEED FLOW

BACKGROUND

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

BRIEF DESCRIPTION

According to one embodiment, a system is provided. The system includes a first environmental control sub-system, operating in a first mode, that receives a first medium at a first flow amount and a first pressure. The system also includes a second environmental control sub-system, operating in a second mode, that receives a second medium at a second flow amount and a second pressure. The first flow amount is greater than the second flow amount, and the second pressure is greater than the first pressure.

Additional features and advantages are realized through the techniques of the embodiments herein. Other embodiments and aspects thereof are described in detail herein and are considered a part of the claims. For a better understanding of the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages are apparent from the following detailed description taken in conjunction with the accompanying drawings in which:

FIG. 1 is a diagram of an schematic of an environmental control system according to an embodiment;

FIG. 2 is a schematic of a pressurized air flow according to an embodiment; and

FIG. 3 is a schematic of a pressurized air flow according to another embodiment.

DETAILED DESCRIPTION

A detailed description of one or more embodiments of the disclosed apparatus and method are presented herein by way of exemplification and not limitation with reference to the FIGS.

Embodiments herein provide an airplane comprising one or more engines, a distribution system, one or more environmental control systems, and one or more flows of pressurized air. The one or more flows of pressurized air can include a first flow of pressurized air and a second flow of pressurized air. The second flow of pressurized air can be different than the first flow of pressurized air in quantity. Embodiments herein can be configured such that the distribution system can receive more of the first flow than that of the second flow to optimize the fuel burn.

The one or more engines can comprise propulsion systems for the aircraft. In an embodiment, the propulsion system comprise turbines, compressors, and the like that intake and pressurize air to generate mechanical power. In an embodiment, the one or more engines can comprise an auxiliary power unit of the aircraft. The propulsion system can further include one or more bleed ports, which allow the pressurized air (e.g., the pressurized volume) from internal portions of the propulsion system to be extracted (e.g., a flow of a pressurized volume by being "bled" from a compressor stage of a turbine engine, and temperature, and pressure of this pressurized volume varies widely depending upon a compressor stage and a revolutions per minute of the turbine engine). Each of the one or more bleed ports can be located at different sections of the propulsion system to extract the pressurized air at different pressures. For instance, a first bleed port can be located at a low pressure section of the propulsion system and, therefore, can be referred to as a low pressure port. Further, a second bleed port can be located at a high pressure section of the propulsion system and, therefore, can be referred to as a high pressure port. In turn, the first flow of pressurized air can be sourced from the low pressure port of any one of the one or more engines, and the second flow of pressurized air can be sourced from the high pressure port of any one of the one or more engines. Bleeding the medium at a low pressure from the low pressure location causes less of a fuel burn than bleeding air from a higher pressure location.

The distribution system receives from the one or more environmental control systems the one or more flows of pressurized air. The distribution system then distributes the one or more flows of pressurized air to the aircraft. The distribution system comprises one or more chambers of the aircraft, such as a cabin or a flight deck, and other airplane systems. The distribution system also comprises valves, tubes, pipes, and the like that regulate, direct, and/or control the one or more flows of pressurized air to the chambers and other airplane systems.

The one or more environmental control system can utilize bleed pressures from the one or more flows of pressurized air to power the environmental control systems, to provide pressurization, and to provide cooling at a high engine fuel burn efficiency to the distribution system.

Turning now to FIG. 1, an environment 10 comprises an environmental control system 100, (e.g., the one or more environmental control systems described above) that comprises a compressing device 102 and a heat exchanger 104. The environment 10 also comprises a distribution system 110 (e.g., the distribution system described above) and an engine 120 (e.g., the one or more engines described above). In operation, the environmental control system 100 receives a medium from the engine 120 and provides a conditioned form of the medium to the distribution system 110.

The elements of the environment 10 and components therein are connected via valves, tubes, pipes, and the like. Valves are devices that regulate, direct, and/or control a flow of a medium by opening, closing, or partially obstructing various passageways within the tubes, pipes, etc. of the environment 10. Valves can be operated by actuators, such that flow rates of the medium in any portion of the environment 10 can be regulated to a desired value.

As shown in FIG. 1, a medium can flow from the engine 120 through the environmental control system 100 to the distribution system 110, as indicated by solid-lined arrows A, B. In the environmental control system 100, the medium can flow through the compressing device 102, through the heat exchanger 104, from the compressing device 102 to the heat exchanger 104, from the heat exchanger 104 to the compressing device 102, etc.

The medium, in general, can be air (e.g., a flow of pressurized air), while other examples include gases, liquids, fluidized solids, or slurries. When the medium is being provided by the engine 120 connected to the environmental control system 100, the medium can be referred to herein as bleed air. With respect to bleed air, a high-pressure location of the engine 120 can be utilized to provide the medium at an initial pressure level above a pressure of the medium once it is in the distribution system 110 (e.g., chamber pressure). With respect to bleed air, a low-pressure location of the engine 120 can be utilized to provide the medium at an initial pressure level near a pressure of the medium once it is in the distribution system 110 (e.g., chamber pressure).

The compressing device 102 is a mechanical device that controls and manipulates the medium (e.g., increasing the pressure of bleed air). Examples of a compressing device 102 include an air cycle machine, a three-wheel machine, a four wheel-machine, etc. The compressing can include a compressor, such as a centrifugal, a diagonal or mixed-flow, axial-flow, reciprocating, ionic liquid piston, rotary screw, rotary vane, scroll, diaphragm, air bubble compressors, etc. Further, compressors can be driven by a motor or the medium (e.g., bleed air, chamber discharge air, and/or recirculation air) via a turbine.

The heat exchanger 104 is a device built for efficient heat transfer from one medium to another. Examples of heat exchangers include double pipe, shell and tube, plate, plate and shell, adiabatic wheel, plate fin, pillow plate, and fluid heat exchangers. In an embodiment, air forced by a fan (e.g., via push or pull methods) can be blown across the heat exchanger at a variable cooling airflow to control a final air temperature of the bleed air.

In an embodiment, the environmental control system 100 can operate according to one or more modes. The one or more modes include at least a first mode and a second mode. The first mode can be a low pressure mode. During the first mode, a first bleed port of the engine 120 can be a low pressure port that supplies (as indicated by the solid-lined arrow A) a first flow of the medium to the environmental control system 100. The second mode can be a high pressure mode. During the second mode, a second bleed port of the engine 120 can be a high pressure port that supplies (as also indicated by the solid-lined arrow A) a second flow of medium to the environmental control system 100. Regardless of which mode the environmental control system 100 is operating in, once the medium has passed through and been worked on by the environmental control system 100, the medium is sent to the distribution system 110 (as indicated by the solid-lined arrow B).

In view of the above, FIGS. 2-3 will now be described with respect to a trend in the aerospace industry towards more efficient environments 10 so as to provide cabin pressurization and cooling at lower engine bleed pressures at a cruise condition. Further, embodiments herein can also bleed different bleed ports at the cruise condition and vary an amount of bleed air extracted from each engine.

Regarding FIG. 2, an environment 20 comprises environmental control systems 200.1 and 200.2 (e.g., the one or more environmental control systems described above), a distribution system 210 (e.g., the distribution system described above), and an engine 220 (e.g., the one or more engines described above). In operation, the environmental control system 200.1 receives a first flow of a medium from the engine 220 (as indicated by solid-lined arrow 2A-1) and provides a conditioned form of the medium to the distribution system 210 (as indicated by solid-lined arrow 2B-1). Further, the environmental control system 200.2 receives a second flow of a medium from the engine 220 (as indicated by solid-lined arrow 2A-2) and provides a conditioned form of the medium to the distribution system 210 (as indicated by solid-lined arrow 2B-2). Each of the environmental control systems 200.1 and 200.2 can operate in either of the first mode or the second mode.

In an embodiment, the environment 20 can provide 100% of the flow demanded by the distribution system 210 by utilizing a 50% flow from each of the flows 2A-1 and 2A-2.

In another embodiment, the environment 20 can provide 100% of the flow demanded by the distribution system 210 by extracting different flow amounts via each of the flows 2A-1 and 2A-2. For example, when the environmental control system 200.1 is operating in the first mode, a low pressure port of the engine 220 can provide the flow 2A-1 at a flow amount within a range bound by 50% and 100%. Further, when the environmental control system 200.2 is operating in the second mode, a high pressure port of the engine 220 can provide the flow 2A-2 at a flow amount within a range bound by 0% and 50%. Examples of distributed flow amounts include, but are not limited to, 51% to 49% split respectively between the low pressure port and the high pressure port; 60% to 40% split respectively between the low pressure port and the high pressure port; 70% to 30% split respectively between the low pressure port and the high pressure port; and 81% to 29% split respectively between the low pressure port and the high pressure port.

Note that the environment 20 bleeds more of the medium off of the low pressure port, and less off the high pressure port, to optimize the fuel burn. That is, the advantage herein is that it is desirable to bleed a small amount of flow from a higher pressure port and use that higher pressure to make very cold air. This cold air can then be mixed with a larger amount of cool to warm air taken from the engine 220 at a lower energy state. This combination allows for the optimum use of energy.

Regarding FIG. 3, an alternative embodiment of the environments 10 and 20 are illustrated as environment 30. The environment 30 comprises environmental control systems 300.1 and 300.2 (e.g., the one or more environmental control systems described above), a distribution system 310 (e.g., the distribution system described above), and engines 320.1 and 320.2 (e.g., the one or more engines described above). In operation, the environmental control system 300.1 receives a first flow of a medium from the engine 320.1 (as indicated by solid-lined arrow 3A-1) and provides a conditioned form of the medium to the distribution system 310 (as indicated by solid-lined arrow 3B-1). Further, the environmental control system 300.2 receives a second flow of a medium from the engine 320.2 (as indicated by solid-lined arrow 3A-2) and provides a conditioned form of the medium to the distribution system 310 (as indicated by solid-lined arrow 3B-2). Each of the environmental control systems 300.1 and 300.2 can operate in either of the first mode or the second mode.

In an embodiment, the environment 30 can provide 100% of the flow demanded by the distribution system 410 by utilizing a 50% flow from each of the engines 320.1 and 320.2.

In another embodiment, the environment 30 can provide 100% of the flow demanded by the distribution system 310 by extracting different flow amounts via each of the engines 320.1 and 320.2. For example, when the environmental control system 300.1 is operating in the first mode, a low pressure port of the engine 320.1 can provide the flow 3A-1 at a flow amount within a range bound by 50% and 100%. Further, when the environmental control system 300.2 is operating in the second mode, a high pressure port of the engine 320.2 can provide the flow 3A-2 at a flow amount within a range bound by 0% and 50%. Examples of distributed flow amounts include, but are not limited to, 51% to 49% split respectively between the engine 320.1 and the engine 320.2; 60% to 40% split respectively between the engine 320.1 and the engine 320.2; 70% to 30% split respectively between the engine 320.1 and the engine 320.2; and 81% to 29% split respectively between the engine 320.1 and the engine 320.2.

In other embodiments, the environment 30 can include more than two engines 320.1 and 320.2 and/or more than two environmental control systems 300.1 and 300.2. In one example, 100% of the flow demanded by the distribution system 310 is provided via proportional flows from each of the more than two engines 320.1 and 320.2 and/or the more than two environmental control systems 300.1. In another example, the environmental 30 can provide 100% of the flow demanded by the distribution system 310 by extracting different flow amounts.

In view of the above, a system can be provided according to an embodiment. The system comprise a first environmental control sub-system, operating in a first mode, configured to receive a first medium at a first flow amount and a first pressure; and a second environmental control sub-system, operating in a second mode, configured to receive a second medium at a second flow amount and a second pressure, wherein the first flow amount is greater than the second flow amount, and wherein the second pressure is greater than the first pressure.

According to another embodiment or the system embodiment above, the first mode can be a low pressure mode.

According to another embodiment or any of the system embodiments above, the second mode can be a high pressure mode.

According to another embodiment or any of the system embodiments above, the first environmental control sub-system can receive the first medium from a low pressure port of an engine.

According to another embodiment or any of the system embodiments above, the second environmental control sub-system can receive the second medium from a low pressure port of an engine.

According to another embodiment or any of the system embodiments above, the first and second environmental control sub-systems are configured to respectively condition the first and second mediums and to provide the condition first and second mediums to a distribution sub-system.

According to another embodiment or any of the system embodiments above, the first and second flow amounts can be based on a demand from a distribution sub-system.

According to another embodiment or any of the system embodiments above, the first flow amount can be selected from a range bound by 50% and 100% of the demand of the distribution sub-system.

According to another embodiment or any of the system embodiments above, the second flow amount can be selected from a range bound by 0% and 50% of the demand of the distribution sub-system.

According to another embodiment or any of the system embodiments above, the first flow amount can be 60% of the demand of the distribution sub-system and the second flow amount can be 40% of the demand of the distribution sub-system.

According to another embodiment or any of the system embodiments above, the first flow amount can be 70% of the demand of the distribution sub-system and the second flow amount can be 30% of the demand of the distribution sub-system.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An aircraft, comprising:
a first engine comprising a low pressure port providing a first flow of first bleed air at an initial pressure level near a pressure of the first bleed air once it is in a distribution sub-system;
a second engine comprising a high pressure port providing a second flow of second bleed air at an initial pressure level above a pressure of the first bleed air once it is in the distribution sub-system;
a distribution sub-system distributing one or more flows to the aircraft;
a first environmental control sub-system, operating in a low pressure mode, configured to receive the first flow of the first bleed air from the low pressure port of the first engine and to provide the first flow of the first bleed air to the distribution system, the first flow of the first bleed air being at a first flow amount and a first pressure; and
a second environmental control sub-system, operating in a high pressure mode, configured to receive the second flow of the second bleed air from the high pressure port of the second engine and to provide the second flow of the second bleed air to the distribution system, the second flow of the second bleed air being at a second flow amount and a second pressure, wherein each of the first environmental control sub-system and the second environmental control sub-system includes a compressing device and a heat exchanger, the first and second environmental control sub-systems being configured to respectively condition the first and second flows of the first and second bleed air and to provide the conditioned first and second flows to the distribution sub-system, wherein the first and the second environmental control sub-systems provide the first and the second flow amounts to the distribution system to provide a total flow that meets a demand of the distribution sub-system, wherein the first and second flow amounts are based on the demand from the distribution sub-system, the first flow amount being selected from a range bound by 50% and 100% of the demand of the distribution sub-system, the second flow amount being selected from a range bound by 0% and 50% of the demand of the distribution sub-system the first flow amount being greater than the second flow amount, and wherein the second pressure is greater than the first pressure.

2. The aircraft of claim 1, wherein the first flow amount is 60% of the demand of the distribution sub-system and the second flow amount is 40% of the demand of the distribution sub-system.

3. The aircraft of claim 1, wherein the first flow amount is 70% of the demand of the distribution sub-system and the second flow amount is 30% of the demand of the distribution sub-system.

* * * * *